United States Patent
Franke et al.

(10) Patent No.: US 7,496,617 B2
(45) Date of Patent: Feb. 24, 2009

(54) TAMPER PROOF GENERATION OF TRUE RANDOM NUMBERS

(75) Inventors: Andreas Franke, Königslutter-Rottorf (DE); Reinhold Koller, Wörth A.D. (DE)

(73) Assignee: Siemens Aktiengesellschaft, Munich (DE)

( * ) Notice: Subject to any disclaimer, the term of this patent is extended or adjusted under 35 U.S.C. 154(b) by 316 days.

(21) Appl. No.: 10/592,018

(22) PCT Filed: Feb. 2, 2005

(86) PCT No.: PCT/EP2005/050453
§ 371 (c)(1), (2), (4) Date: Sep. 7, 2006

(87) PCT Pub. No.: WO2005/085992
PCT Pub. Date: Sep. 15, 2005

(65) Prior Publication Data
US 2007/0276890 A1    Nov. 29, 2007

(30) Foreign Application Priority Data
Mar. 8, 2004    (DE) .................. 10 2004 011 170

(51) Int. Cl.
*G06F 1/02*    (2006.01)

(52) U.S. Cl. .................................................. 708/255
(58) Field of Classification Search .......... 708/250–256
See application file for complete search history.

(56) References Cited

U.S. PATENT DOCUMENTS 5,150,036 A * 9/1992 Pourprix .................... 324/71.4
5,706,404 A * 1/1998 Colak ......................... 706/33

FOREIGN PATENT DOCUMENTS

| DE | 38 02 197 A1 | 8/1989 |
| DE | 276 574 A1 | 2/1990 |
| DE | 101 00 346 A1 | 7/2002 |
| DE | 101 17 362 A1 | 10/2002 |
| EP | 1 341 079 A2 | 9/2003 |
| EP | 1 513 061 A1 | 3/2005 |
| JP | 55088135 A | 7/1980 |

* cited by examiner

Primary Examiner—Tan V Mai
(74) Attorney, Agent, or Firm—Laurence A. Greenberg; Werner H. Stemer; Ralph E. Locher

(57) ABSTRACT

A method and a device generate a truly random number. The novel method obtains the true random number on the basis of a stochastically distributed duration of an electric charge exchange or charge reversal process. The processes for charge exchange in memory cells, for example the EEPROM or FLASH memory cells, carried out by way of a charge pump are particularly suitable for this purpose.

16 Claims, 2 Drawing Sheets

TAMPER PROOF GENERATION OF TRUE RANDOM NUMBERS

BACKGROUND OF THE INVENTION

FIELD OF THE INVENTION

The present invention relates to a method and an apparatus for generating a true random number.

For access protection or encryption purposes, for example, it is necessary to generate good tamper-proof random numbers. In connection with vehicle immobilizers, said random numbers are generated e.g. at engine control system level which in many cases involves an embedded system, the use of external sources being ruled out because of possible tampering and the use of special circuits being ruled out due to the associated additional piece costs.

One known method of generating true random numbers is to use the low-order bits of an A/D conversion of signals from a separate noise source. However, this entails considerable costs. It is likewise known to generate a true random number via a time measurement of an external event, e.g. the duration of a key depression performed by the user. However, this solution is ruled out at least in cases where the system initiates communication and therefore has to generate the random number prior to an external event. In addition to the generation of true random numbers it is further known to use a pseudorandom number sequence and store the current status e.g. in a nonvolatile memory of the system. However, the quality of pseudorandom numbers is unsatisfactory compared to true random numbers.

SUMMARY OF THE INVENTION

The object of the invention is to specify a method and an apparatus enabling a true random number to be generated quickly, i.e. in the millisecond range, for example, in a memory saving manner, independently of equipment runtime, without storage between the operating cycles of the control device and without external sources (random triggers).

This object is achieved by the features of the independent claims.

Advantageous embodiments and developments of the invention will emerge from the dependent claims.

The method according to the invention builds on the generic prior art in that the true random number is generated on the basis of a stochastically distributed duration of an electrical charge reversal process. This solution produces a true random number, i.e. not a pseudorandom number. Moreover, the method cannot be manipulated by external circuitry. In many cases no additional components compared to the existing configuration of the relevant system are required, so that the additional costs are minimal. A further advantage of the method according to the invention is that it is not necessary to store a state which could then be manipulated or rather reset. The inventive method is particularly advantageous if the charge reversal process constituting the stochastic source can be performed in a component which is in any case an integral part of the system which has to generate the random number as well as performing other functions.

In preferred embodiments of the method according to the invention it is provided that the charge reversal process involves charge reversal of at least one memory cell. Memory cells are an integral part of modern systems anyway and therefore constitute a particularly cost-effective basis for carrying out the charge reversal process.

In this connection it can be provided, for example, that at least one memory cell is an EEPROM memory cell. The duration of a charge reversal process of an EEPROM memory cell is subject to comparatively large stochastic variations on the basis of which true random numbers can be generated.

Alternatively, it is likewise possible for at least one memory cell to be a FLASH memory cell. FLASH memories are being increasingly used and therefore in many cases provide a suitable basis for the inventive generation of true random numbers without additional costs.

In preferred embodiments of the method according to the invention it is further provided that the charge reversal process is performed using a charge pump. Charge pumps are commonly employed for example in connection with EEPROMs, on-chip charge pumps being provided in many cases.

With the method according to the invention, it can additionally be advantageously provided that the stochastic duration of the charge reversal process is determined using a counter, it being advantageous if the clocking of the counter is as high as possible so that maximum variations are produced at the end of the charge reversal process in respect of the count used as the basis for the random number.

The method according to the invention is considered to be particularly advantageous if provision is made for it to be performed by an embedded system, in particular by an engine control system of a motor vehicle. In such a case, all embedded systems that are used in environments in which the generation of good random numbers is (also) required are essentially suitable.

The apparatus according to the invention builds on the generic prior art in that it generates the true random number on the basis of a stochastically distributed duration of an electrical charge reversal process. This produces the advantages and characteristics explained in connection with the method according to the invention in an identical or similar manner, for which reason reference is made to the corresponding foregoing comments in order to avoid repetitions.

The same applies mutatis mutandis to the advantageous developments of the inventive apparatus set forth below, reference being made, in this regard also, to the corresponding comments in connection with the method according to the invention.

The apparatus according to the invention is advantageously developed in that it has at least one memory cell which undergoes electrical charge reversal in order to generate the random number.

It can be advantageously provided that at least one memory cell is an EEPROM memory cell.

It is additionally or alternatively possible that at least one memory cell is a FLASH memory cell.

The apparatus according to the invention is advantageously developed by having a charge pump for performing the charge reversal process.

In connection with the apparatus according to the invention it can be additionally provided that it has a counter for recording the stochastically distributed duration of the charge reversal process.

Embodiments of the apparatus according to the invention wherein it is provided that the apparatus is an embedded system, in particular an engine control system of a motor vehicle, are considered to be particularly advantageous.

An essential basic idea of the present invention is that true random numbers can be generated virtually without additional system costs if a component forming part of the system anyway is used, such as a charge pump which is an integral part of a control unit. The invention is particularly suitable for all agencies having to generate a good, true random number using existing systems (i.e. without specially provided components), without having access to independent, tamper-proof generators (triggers). These include, but are not limited to, in particular all cost-optimized embedded systems. In the context of automotive engineering, random numbers are required in particular e.g. for access protection (including maintenance work) and for encryption purposes (e.g. vehicle immobilizers).

Embodiments of the invention will now be explained by way of example with reference to the accompanying drawings, in which:

DESCRIPTION OF THE PREFERRED EMBODIMENTS

Figure 1:
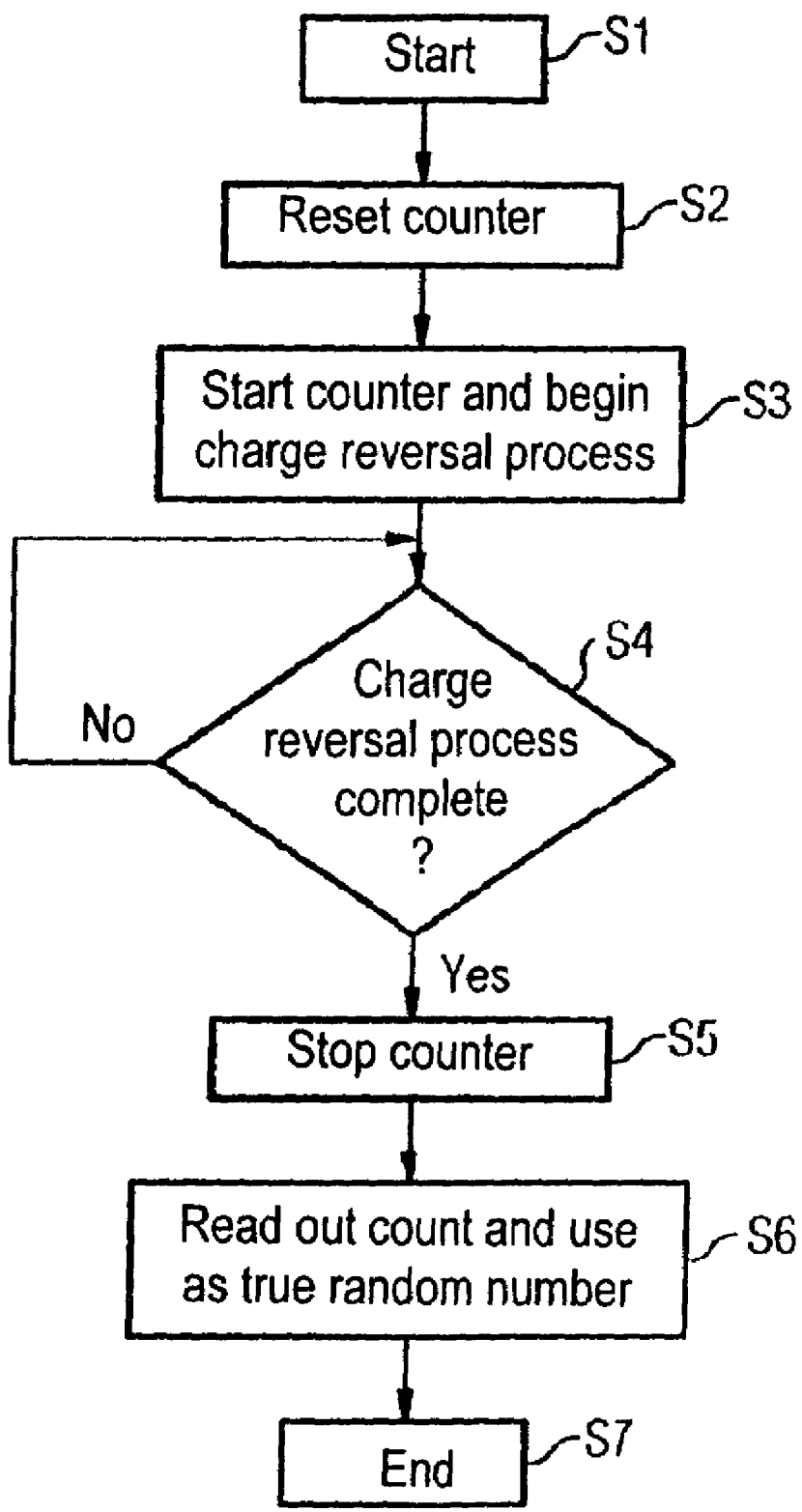
FIG. 1 is a flowchart illustrating an embodiment of the method according to the invention.

The embodiment of the inventive method illustrated in FIG. 1 begins at step S1. In step S2 a counter is reset whose subsequent count serves as the basis for generating the true random number or which directly constitutes said random number. In step S3 a charge reversal process is commenced and the counter simultaneously started. The charge reversal process can be in particular a write to an EEPROM or FLASH memory cell which generally takes place using a charge pump. In step S4 it is checked whether the charge reversal process is complete until this is the case. Then in step S5 the counter is stopped. In step S6 the count is read out and used as a true random number. If necessary, however, the final random number can also be generated using another computing function. The method shown ends with step S7.

Figure 2:
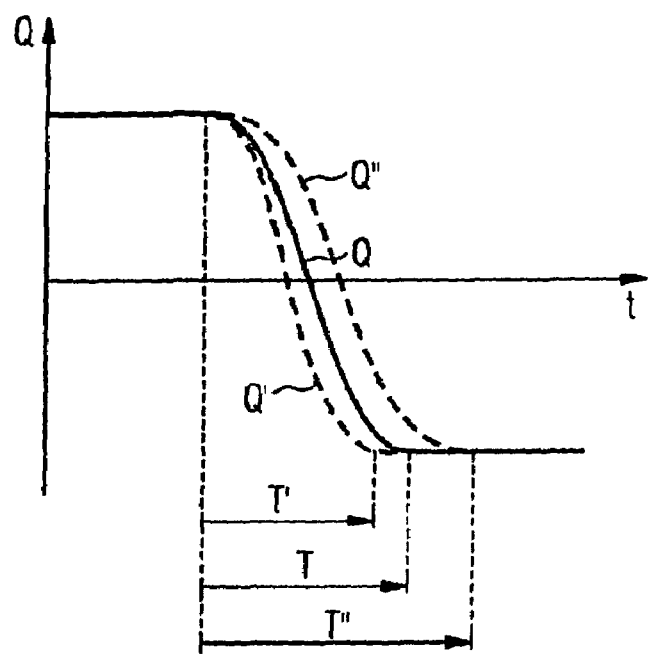
FIG. 2 is a graph showing possible charge reversal processes of a memory cell.

FIG. 2 shows three stochastically distributed charge reversal processes of a memory cell. The actual duration of a current charge reversal process can be between a shortest duration T' (curve Q') and a longest duration T" (curve Q") and can be, for example, T (curve Q).

Figure 3:
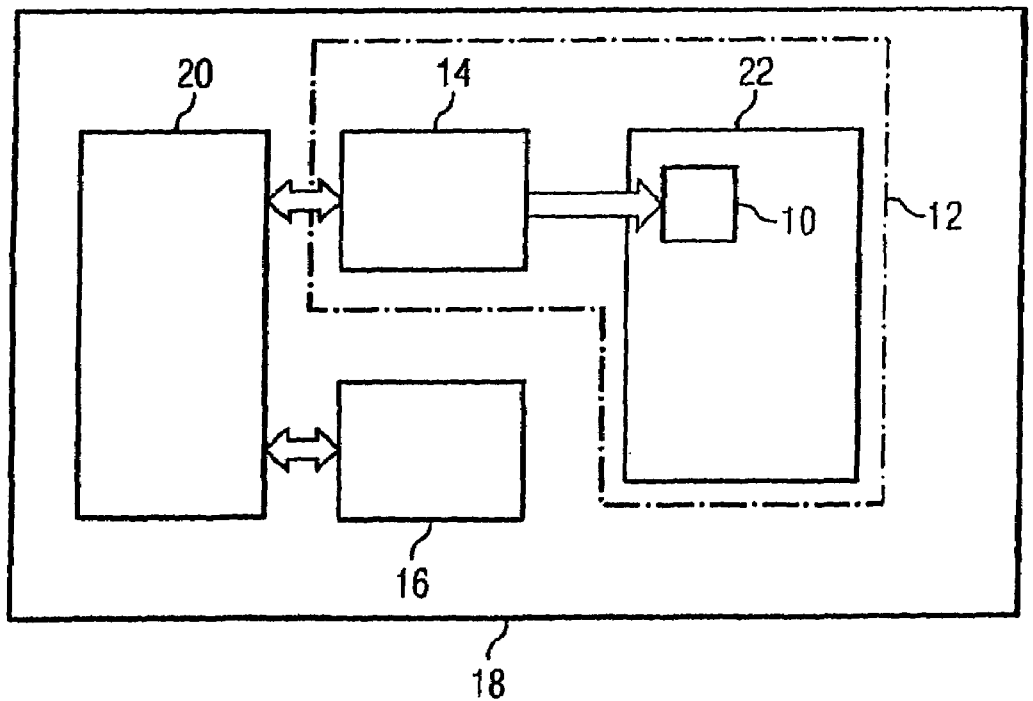
FIG. 3 shows a greatly simplified schematic block diagram of components of an engine control system.

FIG. 3 shows a highly simplified schematic block diagram of engine control components, the engine control system 18 illustrated being present in the form of an embedded system. The engine control system 18 can incorporate a large number of other components (not shown) which are necessary for performing all the tasks placed on the engine control system. All the components explained in greater detail below are an integral part of the engine control system 18 anyway, i.e. not specially provided for generating the true random numbers. The engine control system 18 shown has an intelligent controller 20 which is suitable among other things for driving a charge pump 14 which is provided in order to reverse the charge of a memory cell 10 of a memory cell array 22 of an EEPROM 12 when the contents of the memory cell 10 are to be changed. The controller 20 additionally communicates with a counter 16 with which the actual duration of a charge reversal process of the memory cell 10 is recorded. The average person skilled in the part will recognize that, using the components shown in FIG. 3, the method explained with reference to FIG. 1 can be carried out in an advantageous manner. The sequence of generating a random number will not therefore be explained again here.

The features of the invention disclosed in the above description, in the drawings and in the claims may be essential to the implementation of the invention both individually and in any combination.

We claim:

1. A method for generating a true random number, which comprises:
   measuring a stochastically distributed duration of an electrical charge exchange process; and
   generating the true random number based on the duration of the stochastically distributed electrical charge exchange process.

2. The method according to claim 1, wherein the charge exchange process includes a charge exchange in at least one memory cell.

3. The method according to claim 2, wherein the at least one memory cell is a memory cell of an EEPROM.

4. The method according to claim 2, wherein the at least one memory cell is a FLASH memory cell.

5. The method according to claim 1, which comprises performing the charge exchange process with a charge pump.

6. The method according to claim 1, wherein the measuring step comprises recording the stochastic duration of the charge exchange process with a counter.

7. The method according to claim 1, which comprises implementing the method with an embedded system.

8. The method according to claim 7, which comprises implementing the method with an engine control system of a motor vehicle.

9. An apparatus for generating a true random number, which comprises a device for generating the true random number on the basis of a stochastically distributed duration of an electrical charge exchange process.

10. The apparatus according to claim 9, which comprises at least one memory cell undergoing an electrical charge reversal in order to generate the random number.

11. The apparatus according to claim 10, wherein said at least one memory cell is a memory cell of an EEPROM.

12. The apparatus according to claim 10, wherein said at least one memory cell is a FLASH memory cell.

13. The apparatus according to claim 9, which comprises a charge pump for performing the charge exchange process.

14. The apparatus according to claim 9, which comprises a counter for recording the stochastically distributed duration of the charge exchange process.

15. The apparatus according to claim 9 configured as an embedded system.

16. The apparatus according to claim 9 configured in an engine control system of a motor vehicle.

* * * * *